Figure 1:
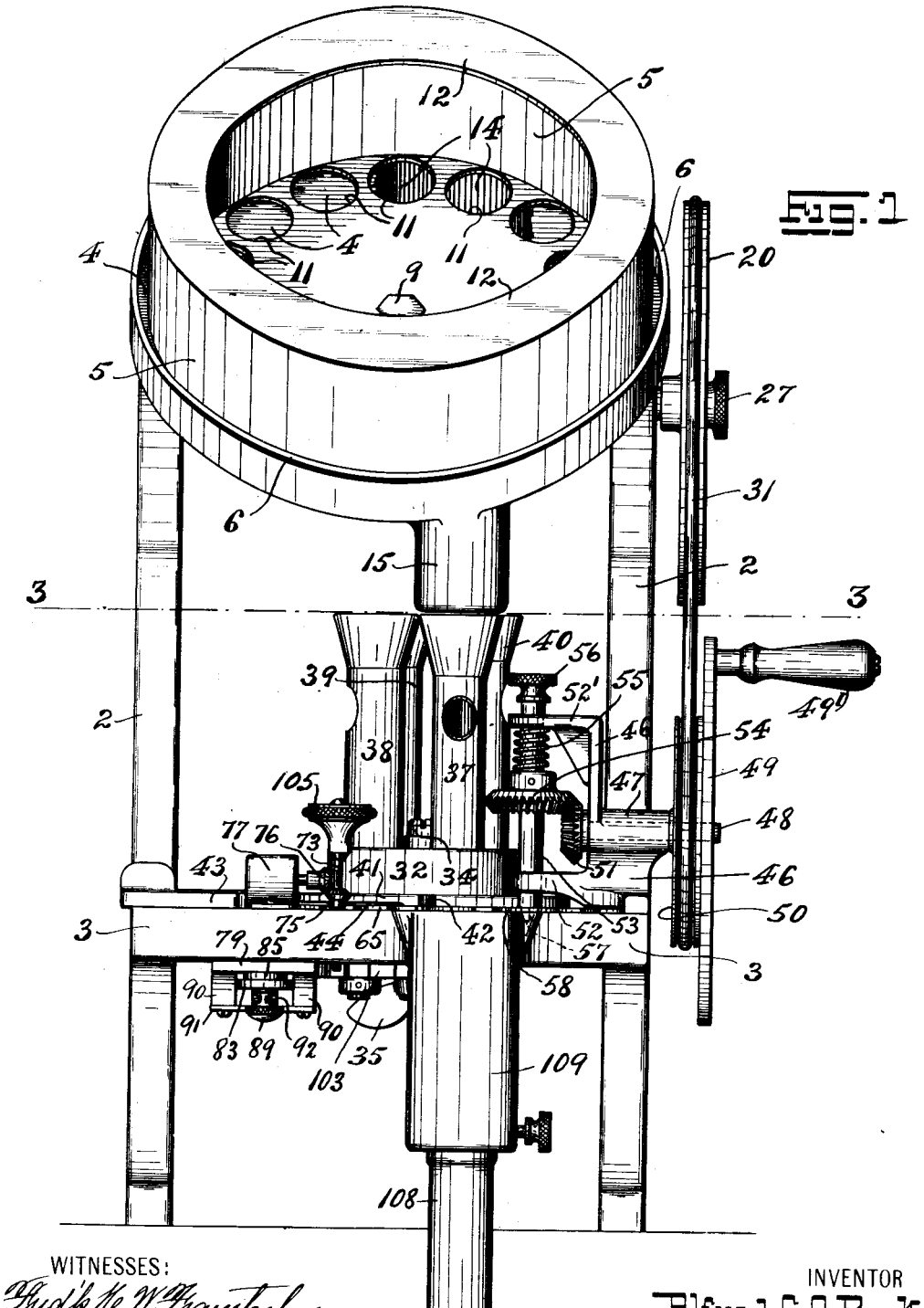

A. C. O. BOCK.
COIN COUNTING MACHINE.
APPLICATION FILED FEB. 3, 1913.

1,080,533.

Patented Dec. 9, 1913.
5 SHEETS—SHEET 1.

WITNESSES:
Fred'k W. Frantzel
Harry E. Pfeffer

INVENTOR
Alfred C. O. Bock,
BY
Frantzel & Richards
ATTORNEYS

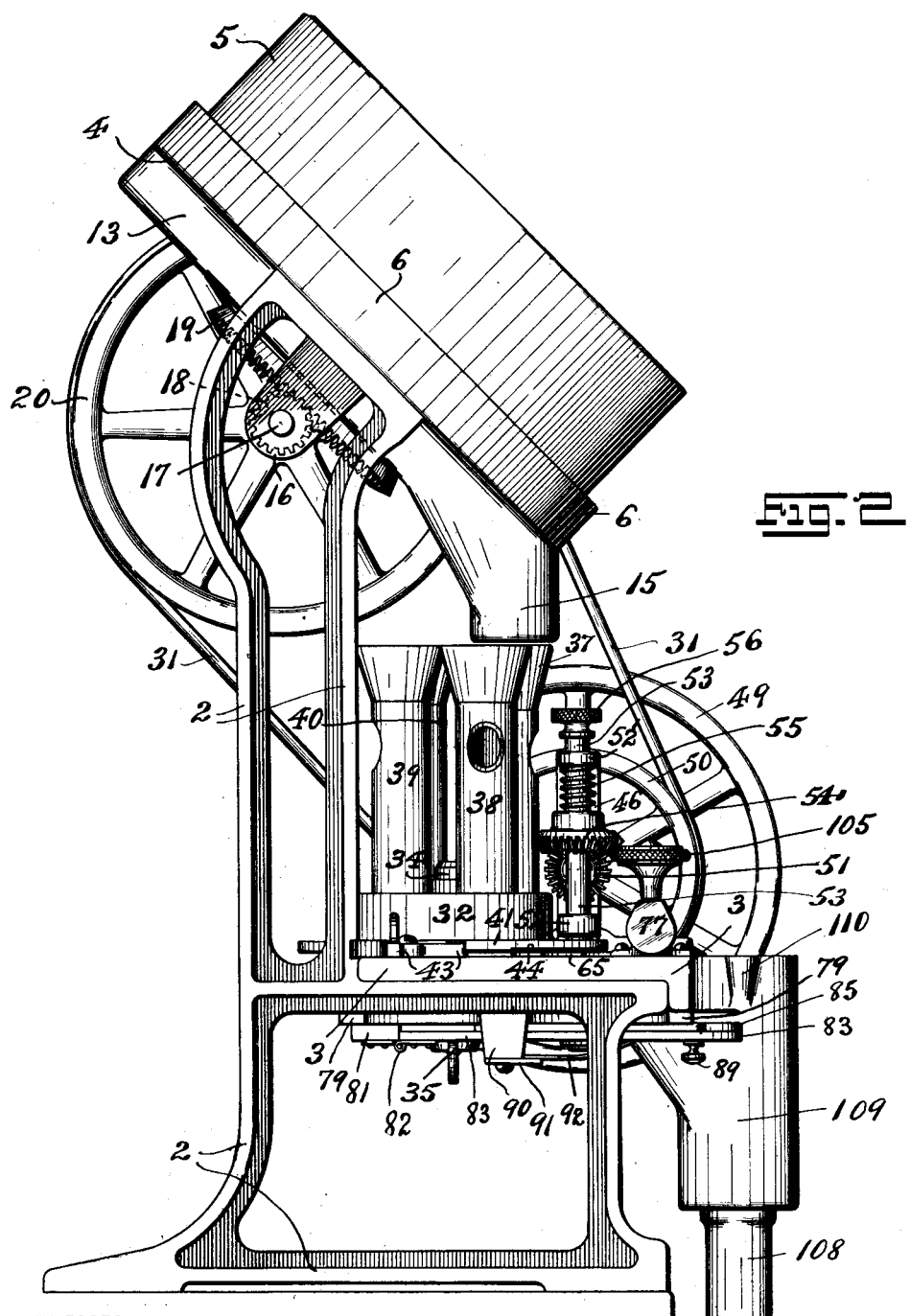

A. C. O. BOCK.
COIN COUNTING MACHINE.
APPLICATION FILED FEB. 3, 1913.
1,080,533.
Patented Dec. 9, 1913.
5 SHEETS—SHEET 3.
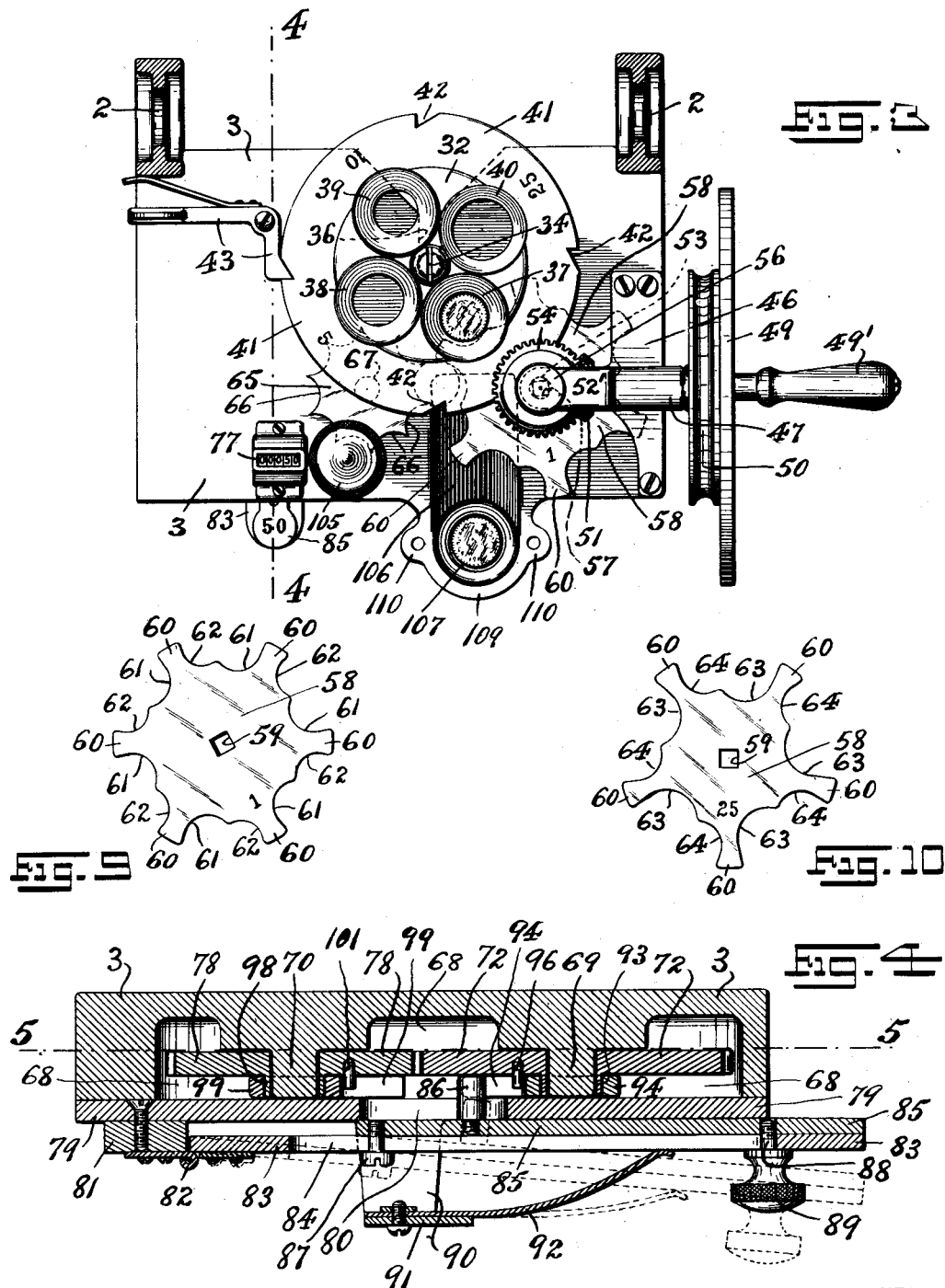
INVENTOR
Alfred C. O. Bock,
BY
Frautzel & Richards
ATTORNEYS

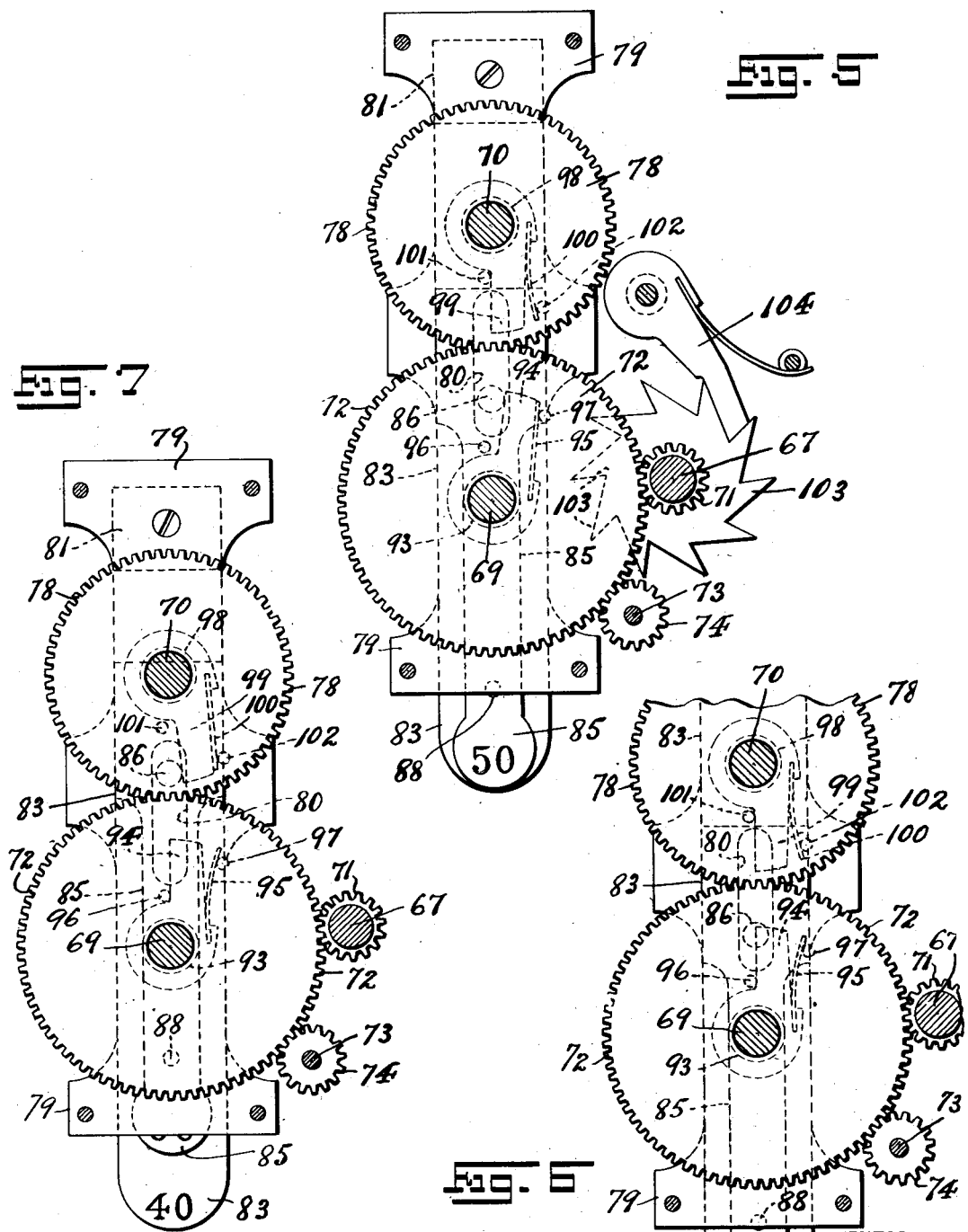

A. C. O. BOCK.
COIN COUNTING MACHINE.
APPLICATION FILED FEB. 3, 1913.
1,080,533.
Patented Dec. 9, 1913.
5 SHEETS—SHEET 5.
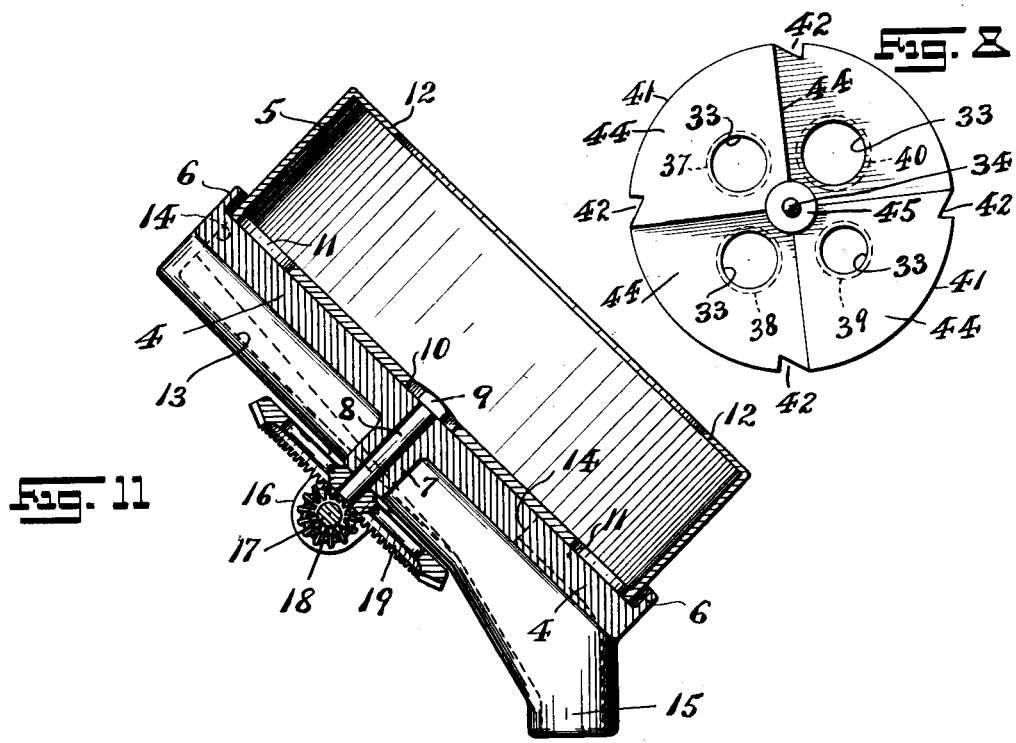
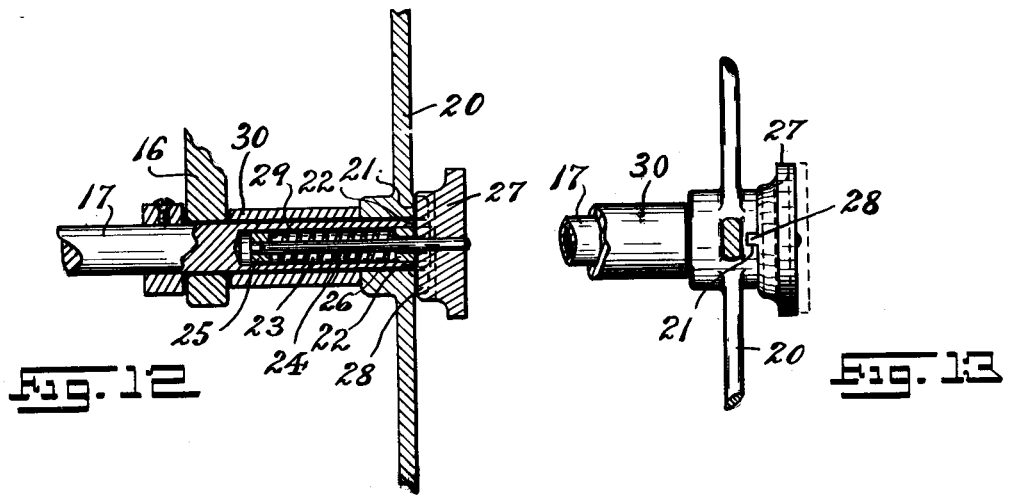
WITNESSES:
INVENTOR
Alfred C. O. Bock,
BY
ATTORNEYS

UNITED STATES PATENT OFFICE.

ALFRED C. O. BOCK, OF BROOKLYN, NEW YORK, ASSIGNOR OF ONE-THIRD TO JOHN J. DONNELLAN AND ONE-THIRD TO JAMES L. DONNELLAN, BOTH OF BROOKLYN, NEW YORK.

COIN-COUNTING MACHINE.

1,080,533.   Specification of Letters Patent.   Patented Dec. 9, 1913.

Application filed February 3, 1913. Serial No. 745,894.

*To all whom it may concern:*

Be it known that I, ALFRED C. O. BOCK, a subject of the Emperor of Germany, residing at Brooklyn, in the county of Kings and State of New York, have invented certain new and useful Improvements in Coin-Counting Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in coin-counting and wrapping machines; and the invention relates, more particularly, to a simple, cheap, accurate and efficient machine for counting out a required number of coins and delivering the same to paper cartons or rolls adapted to envelop the same, so as to provide a package or roll of a specific number of coins.

The present invention has for its principal object to provide an accurate coin-counting and wrapping machine which may be arranged or set to count coins of a selected denomination, and to this end the machine comprises a hopper, a revoluble turret provided with a plurality of stacker tubes, each stacker tube being arranged to receive a particular denomination of coin, and said stacker-tubes being selectively registered beneath the discharge mouth of said hopper mechanism, an interchangeable counting mechanism which is adapted to be arranged to accurately count the coins by successively removing the same from the bottom of the stack of coins deposited from the hopper mechanism in the proper stacker-tube, and a carton or roll holding means into which the coins are finally discharged as they pass through the counting-mechanism.

A further object of the present invention is to provide in said interchangeable coin-counting mechanism means whereby, when a required number of coins have been passed therethrough and counted, the coin-counting mechanism is automatically locked or stopped against the further passage of coins therethrough until said means is again released.

Usually coins of one and ten cent denominations are wrapped in rolls of fifty coins having respectively the value of fifty cents and five dollars, whereas coins of five and twenty-five cent denominations are wrapped in rolls of forty coins having respectively the value of two dollars and ten dollars. It is therefore a further object of this invention to provide in said coin-counting mechanism means whereby the same can be set to count fifty or forty coins, and then automatically stop or lock itself, in accordance with the denomination of coin being operated upon or handled by the machine.

A still further object of the present invention is to provide a means whereby the hopper and coin-counting mechanism are driven from a single operating means, and means whereby said hopper may be disconnected from the operating means so that said coin-counting mechanism may be operated alone.

Other objects of the present invention not at this time more particularly enumerated, will be clearly understood from the following detailed description of the present invention.

With the various objects of this invention in view, the same consists, primarily, in the novel coin-counting and wrapping machine hereinafter set forth; and, furthermore, this invention consists in the novel arrangements and combinations of the various mechanisms and their parts, as well as in the details of the construction thereof, all of which will be hereinafter more fully described in the following specification, and then finally embodied in the clauses of the claims which are appended to and which form an essential part of this specification.

The invention is clearly illustrated in the accompanying drawings, in which:—

Figure 1 is a front elevation of the novel construction of coin-counting and wrapping machine made according to and embodying the principles of the present invention; Fig. 2 is a side elevation of the same; and Fig. 3 is a horizontal section of the same, taken on line 3—3 in said Fig. 1 looking downward. Fig. 4 is a detail cross-section, drawn on an enlarged scale, and taken on line 4—4 in said Fig. 3, the parts above the surface of the table being omitted. Fig. 5 is a horizontal section taken on line 5—5 in said Fig. 4, looking downwardly and illustrating the automatic locking or stopping mechanism as arranged to count the coins in lots of fifty, said locking or stopping mechanism being shown in its operative or holding position; Fig. 6 is a similar view showing said locking or stopping mechanism in its released position permitting the operation of the coin-counting mechanism; and Fig. 7 is a similar view illustrating the locking or stopping mechanism as arranged to count the coins in lots of forty. Fig. 8 illustrates the bottom of said stacker-tube turret, showing how said bottom is cut away to provide a space beneath each stacker-tube corresponding to the thickness of the coin contained in said stacker-tube. Figs. 9 and 10 are face views of kicker-disks employed for the coins of different denomination. Fig. 11 is a vertical cross-section through said hopper mechanism; and Figs. 12 and 13 are views illustrating a clutch mechanism for connecting or disconnecting a driving pulley to the operating shaft of said hopper-mechanism.

Similar characters of reference are employed in all of the hereinabove described views, to indicate corresponding parts.

Referring now to the said drawings, the reference-character 1 indicates one embodiment of the complete coin-counting and wrapping machine made according to and embodying the principles of the present invention, the same comprising a pair of side-frames 2, between which is supported a table 3. Suitably arranged and supported across the top of said side-frames 2 is an inclined bed-plate 4 for supporting thereon a hopper 5. Said bed-plate 4 is provided with an upwardly extending marginal annular flange or wall 6, and is further provided with a centrally disposed bearing-portion 7 in which is journaled a spindle 8. Said spindle 8 is provided with a head 9 of any desired polygonal configuration, the same being exposed above the upper surface of said bed-plate 4. Said hopper 5 is provided with a centrally disposed opening 10 corresponding in shape to said head 9 so as to receive the latter, whereby the rotary movement of said spindle may be transmitted to said hopper. Said hopper is further provided in its bottom adjacent to the outer wall with a plurality of openings or holes 11. The upper marginal edge of said wall of the hopper is provided with an inwardly projecting overhang or flange 12 which prevents the coins deposited within the hopper from escaping over the top of said wall when the hopper is in operation. Integrally formed with the bottom of said bed-plate 4 is a coin-conveying trough 13 which is provided with an opening 14 registering beneath said hopper whereby the coins passing through the openings or holes 11 of said hopper may enter said trough 13 and be guided thereby to the opening of the discharge means or mouth 15 of said trough, it being understood that said trough 13 is inclined at substantially the same inclination as said bedplate so that the coins will naturally gravitate to said discharge means. Extending downwardly from the bottom of said bed-plate 4 are bearing portions 16 in which is journaled a driving-shaft 17. Secured upon said driving-shaft is a bevel-gear 18 which meshes operatively with a bevel-gear 19 which is secured to the lower end of said spindle 8. Mounted so as to turn loosely upon one of the outer projecting ends of said driving-shaft 17 is a driving-pulley 20, the hub of which is provided at its outer face with a transverse groove or female part 21. The end of said driving-shaft 17, upon which said driving pulley is located, is provided with an inwardly extending chamber or cavity 23, and the extremity of said shaft is provided with a groove or female part 22 registering with and corresponding to said groove or female part 21 of said driving pulley. Located within said chamber or cavity is a stem 24 provided at its inner end with a collar or enlarged portion 25. Secured within the mouth of said chamber or cavity 23 is a centrally perforated block 26, through the perforation of which extends said stem 24, and secured upon the outer end of said stem is a clutch-member 27 provided with a tongue or male part 28 adapted to enter said groove or female part 21 of said driving-pulley and said groove or female part 22 at the extremity of said driving-shaft to couple said driving-pulley in operative relation with said shaft. Arranged about said stem 24 between said collar or enlarged portion 25 and said block 26 is a coil spring 29 under compression, which tends to normally move said clutch-member 27 toward the end of said shaft 17. A sleeve 30 loosely arranged upon said shaft 17 between a bearing-portion 16 and said driving-pulley 20 tends to maintain the latter in proper position upon said shaft 17 to always be properly related to the clutch means. When said clutch-member 27 is drawn outwardly so as to remove its tongue or male part 28 from clutched relation with said pulley and shaft as above described, and is then given a slight turn so as to engage said tongue or male part 28 against the normal edge of the end of said shaft 17, thus preventing the same from entering the grooves or female parts of the driving-pulley 20 and shaft 17, and permitting said driving-pulley to be rotated without imparting its movement to said shaft 17. Said driving-pulley is provided with a grooved periphery so as to receive the operative contact of a driving-belt 31.

The reference-character 32 indicates a rotatably mounted turret for supporting a plurality of stacker-tubes for coins of various denominations, said turret being provided with openings 33 which extend vertically therethrough from top to bottom, and in which the said stacker tubes are secured. Said turret is secured by a bolt 34 and wing nut 35 in operative relation to said table 3, the latter being provided with a slotted portion 36 open at one end whereby said bolt 34 may be located in connection with said table 3 and secured in proper position with relation to the other parts of the coin-handling mechanism. I have illustrated in the drawings a turret 32 provided with a stacker-tube 37 for one-cent coins, a stacker-tube 38 for five-cent coins, a stacker-tube 39 for ten-cent coins, and a stacker-tube 40 for twenty-five cent coins, although it will be clearly understood that stacker-tubes for coins of other denominations may be employed, and that when the machine is arranged to count coins of countries foreign to the United States, a greater or less number of stacker tubes may be employed and constructed to accommodate the size and number of said foreign coins, all without departing from the scope of the present invention, and without altering the principles under which said invention operates. Said turret 32 is provided at its bottom portion with a flange 41, in the periphery of which are cut suitable notches 42, corresponding in number to the number of stacker-tubes and adapted to be engaged by the nosing of a spring-actuated positioning pawl 43 which is pivotally mounted upon said table 3, whereby the turret may be turned and stopped to properly locate the desired stacker-tube beneath the discharge-means 15 of said hopper-mechanism, and position the same in proper relation to the coin-counting means to be subsequently described. As said turret rests upon the table 3, and since it is the principle of the machine that the coins are removed from the bottom of the stacker-tube, that is the bottom coin of the pile of coins stacked within the stacker-tubes is operated upon by the coin-counting means, it follows that sufficient space must be provided between the bottom of the turret and its stacker-tubes and the table 3 to permit the passage of a coin edgewise therebeneath, and to this end said turret is provided with cutaway portions 44 which radiate from a hub-portion 45 so as to extend beneath each stacker-tube and the openings 33, these cutaway portions 44 corresponding in depth to the thickness of the coin carried by the stacker-tube immediately registered above, thus providing when said turret is in position in connection with said table 3 a passage for the respective coins.

The reference-character 46 indicates a bracket-member secured in a suitable location by any desirable means upon said table 3. Said bracket-member is provided with a horizontal bearing-portion 47 in which is journaled a driving-spindle 48. Secured upon the outer end of said driving-spindle is a crank-wheel 49 provided with a handle 49' for rotating the same. Connected with said crank-wheel is a grooved pulley-wheel 50, preferably of smaller diameter, and over which runs said driving-belt 31 whereby the latter is caused to impart movement to said pulley-wheel 20 above described. Secured upon the inner end of said driving spindle is a bevel-gear 51. Connected with said bracket member 46 are a pair of forwardly projecting arms 52 and 52' which are provided with vertically disposed openings adjacent to their ends adapted to serve as bearings for a vertical spindle 53. Secured upon said vertical-spindle 53 is a bevel-gear 54 which meshes with said bevel-gear 51 of said driving-spindle. Arranged about said vertical-spindle between said arm 52 and the hub of said bevel-gear 54 is a coil-spring 55 the compression of which tends to maintain said bevel-gear 54 and vertical spindle in operative position with the former meshing with said bevel-gear 51. The upper free end of said vertical spindle is provided with a handle-portion or grip 56 by means of which said vertical-spindle may be moved upwardly in its bearings against the compression of said coil-spring. The lower end of said vertical-spindle is provided with a squared-end 57.

The reference-character 58 indicates a kicker-disk, the same possessing a centrally disposed square opening 59 whereby said squared end 57 of said vertical-spindle is received to couple the kicker-disk with said vertical spindle so that the former will be driven or rotated by the revolution of the latter. The said kicker-disks are interchangeable and easily and quickly removed or attached in operative relation to said driving-spindle by sliding the latter upwardly in its bearings to allow the kicker-disk to be inserted beneath the squared end 57, so that when said vertical spindle is released said coil-spring 55 presses the same downward so that the squared end enters the square-opening of the kicker-disk, the compression of said coil-spring maintaining said parts in this normally coupled relation. Said kicker-disks are constructed to operate in removing coins from the bottom of the stacker-tubes above described, and each kicker-disk is made to accommodate itself to two coins of different diameters. To this end each kicker-disk is provided with a plurality of radiating kicker-arms 60. Upon one side of each kicker-arm is provided a marginal recess or cutout portion corresponding to the diameter of one coin, and on the other side of each kicker-arm is provided a marginal recess or cut-out portion corresponding to the diameter of another coin of different size. The kicker-disks when operated always turn in one direction. Therefore by coupling the kicker disk with said vertical spindle with one of its flat sides upward it will accommodate itself to the smaller coin, and by coupling the kicker disk with its opposite side upward it will accommodate itself to the larger coin. For example refer to Figs. 9 and 10 of the drawings, in said Fig. 9 the kicker-disk 58 is provided with the kicker-arms 60 upon one side of which are the marginal recesses or cut-out portions 61 adapted to operate to pass coins of the one-cent denomination, and upon the other side of which are the marginal recesses or cut-out portions 62 adapted to operate to pass coins of the ten-cent denomination when said kicker-disk is reversed; in said Fig. 10 the kicker-disk 58 is provided with the kicker-arms 60 upon one side of which are the marginal recesses or cut-out portion 63 adapted to operate to pass coins of the twenty-five cent denomination, and upon the other side of which are the marginal recesses or cut-out portions 64 adapted to operate to pass coins of the five-cent denomination, when said kicker-disk is reversed. When properly assembled or connected with said vertical spindle said kicker-disks 58 lie flat upon said table 3, and when rotated the kicker-arms 60 pass beneath said turret and the stacker tube registered above their path of movement or rotation, one of said kicker arms, thereby engaging the bottom coin of the stack of coins, which is contained in the stacker-tube and which rests upon the surface of said table 3, thereby propelling that bottom coin to and through the counting mechanism, the next coin above falling to the table 3 in front of the succeeding kicker-arm, and being in turn propelled thereby, and so on until the allotted number of coins have been passed through the counting mechanism and delivered to the paper-rolls or cartons, all of which will be subsequently described.

The reference character 65 indicates a counter-disk provided at its periphery with a series of marginal depressions 66 adapted to be engaged by the perimeter of a coin propelled into contact therewith by said kicker-disk 58. Preferably said marginal depressions 66 are ten in number since in handling, counting and wrapping coins of the United States coinage, it is customary to wrap them in multiples of ten, although it must be understood that in adapting the machine for counting coins of foreign coinage the number of said marginal depressions may be altered to suit the convenience or necessity resulting from the different coin values. The said counter-disk 65 is affixed upon the upper end of a spindle 67 which is journaled in the table 3, so that said counter-disk lies flat upon said table 3. The under side of said table 3 is preferably hollowed out to provide a chamber 68 into which project a pair of journal-studs 69 and 70. The said spindle 67 projects within said chamber 68 and is provided with a spur-gear 71 preferably provided with sixteen teeth. Rotatably mounted upon said journal-stud 69 is a gear-wheel 72, the same being provided with eighty teeth so as to establish a five to one ratio between said spur-gear and said gear-wheel, that is, so that five revolutions of said counter-disk, spindle and spur-gear will produce one revolution of said gear-wheel. Also journaled in said table 3 is another spindle 73 upon the lower end of which is affixed a spur-gear 74 which meshes operatively with said gear-wheel 72. Said spur-gear 74 is preferably provided with sixteen teeth so that a five to one ratio is established between the same and said gear-wheel 72, that is said spur-gear 74 will make five revolutions to one of said gear-wheel 72, and will thus correspond in movement to said counter-disk. Secured to the upper end of said spindle 73 above the surface of the table 3 is a bevel-gear 75 which meshes with the bevel-gear 76 affixed to the operating shaft of a counting or total adder mechanism 77 mounted upon said table 3. The geared relation of said counting or total adder mechanism with said counter-disk is such that with the passage of each coin past the counter-disk whereby the same is operated, the said total-adder mechanism will be operated to register a unit in the total account of the coins so passed. Rotatably mounted upon said journal-stud 70 is another gear-wheel 78 which meshes with said gear-wheel 72, said gear-wheel 78 being provided with sixty-four teeth so as to establish a four to one ratio between said spur-gear 71 and said gear-wheel 78, as driven by the latter through the intermediate operation of said gear-wheel 72, that is, so that four revolutions of said counter-disk, spindle and spur-gear 71 will produce one revolution of said gear-wheel 78.

While the ratio established between the above gears is preferable it will be understood that the same may be varied if desired, in order to accommodate the device to any necessary alteration of the counting system made necessary by different characters of coins, as, for example, coins of foreign denominations.

It will also be understood that the number of gear-teeth in each wheel may be increased or decreased, while yet maintaining the same ratio of movement between the respective gears, if such a change is found desirable.

Secured to the underside of said table 3 so as to extend transversely beneath said gear-wheels 72 and 78 is a carrier-plate 79, the same being provided with a properly disposed longitudinal slot 80. Secured to the rear end of said carrier-plate 79, in any suitable manner, is a block 81 to which is pivotally connected by means of a suitable hinge 82, or other suitable pivotal connection, a swing-plate 83, the same being adapted to move or swing in a vertical plane. Said swing-plate 83 is provided with a longitudinally extending slot 84. Slidably mounted upon said swing-plate is a slide-plate 85 the same carrying a stop-post 86 which projects upwardly through said slot 80 of said carrier-plate 79. Secured in the rear end of said slide-plate 85 is a guide-screw 87 which projects downwardly through said slot 84 of said swing-plate 83, and serves both to maintain said slide-plate in proper position upon said swing-plate, and by engaging the end of said slot 84 to limit the inward movement of said slide-plate. In like manner secured to the outer end of said slide-plate is a lock-screw 88 the shank of which passes through said slot 84 acting as a guide and stop to limit the outward movement of said slide-plate, and the head 89 of which engaging the marginal edges of said slot 84 when screwed tight serves to lock said slide-plate in any of its adjacent positions. The said gear-wheel 72 is provided upon its under side with a hub-portion 93. Journaled upon said hub-portion 93 is a stop-pawl 94 which is actuated by a leaf-spring 95 associated therewith to maintain a normal position of said stop-pawl against a stop-pin 96 which is secured to the body of said gear-wheel 72. A second stop-pin 97 also secured to the body of said gear-wheel 72 against which said leaf-spring gains its purchase serves also to limit the swinging movement or oscillation of said stop-pawl 94. In like manner said gear-wheel 78 is also provided upon its underside with a hub-portion 98. Journaled upon said hub-portion 98 is a stop-pawl 99 which is actuated by a leaf-spring 100 associated therewith to maintain a normal position of said stop-pawl against a stop-pin 101 which is secured to the body of said gear-wheel 78. A second stop-pin 102, also secured to the body of said gear-wheel 78, against which said leaf-spring gains its purchase serves also to limit the swinging movement or oscillation of said stop-pawl 99. When said swing-plate 83 is in its normal horizontal position so maintained by said leaf-spring 92, said stop-post 86 is projected into the path of rotation of either of said stop-pawls above described according to the adjusted position of said slide-plate 85 which governs the position of said stop-post, and being engaged by said stop-pawl stops or prevents the further rotation of the gear-wheel with which said stop-pawl is connected, and therefore stops or locks the coin counting mechanism against further operation. By pushing down said swing-plate 83 against the tension of said leaf-spring 92, thus carrying downward said slide-plate 85 and the stop-post 86, the latter may be removed or withdrawn from the path of said stop-pawl, the spring of which forces the same back to its normal initial position, which would be above the end of said stop-post thereby preventing the latter from returning to its obstructing position until a rotation of the gear-wheel had carried said stop-pawl past the stop-post, whereupon the leaf-spring 92 returning said swing-plate, slide-plate and stop-post back to normal position, the latter would again be projected into the path of said stop-pawl ready to again interrupt its movement and the rotation of said gear-wheel with which it is connected after said gear-wheel had completed another revolution. All of which operations will be clearly comprehended from an examination of Figs. 4, 5, 6, and 7 of the drawings in which said operations are illustrated. Connected with said spindle 67 upon which the spur-gear 71 and counter-disk are mounted is a ratchet-wheel 103 which is engaged by a spring-controlled pawl 104, the same preventing the rotation of said counter-disk in a backward or any direction contrary to its proper movement, and consequently preventing any backward movement of the whole counting-mechanism. Connected with the upper end of said spindle 73 is a hand-wheel 105, or operating device, which serves to turn said spindle to operate the counting-mechanism above described to set the same when preparing to count coins wrapped in lots of forty instead of fifty as will be subsequently described. Said kicker-disk 58 after having propelled the coins past said counter-disk and in contact therewith so as to operate the counting mechanism precipitates the coins into a chute 106 formed in the upper surface of said table 3, by means of which the coins are delivered to a carton or wrapper 107 held for their reception in a wrapper-holder 108 which is connected with the lower end of a funnel-member 109 with which said chute communicates. Said chute and funnel portion may be covered over by securing any suitable cover device to the perforate ears 110 connected with said funnel portion, thereby guarding against the accidental precipitation of any coin therein which has not passed through the counting-mechanism. It is also apparent that said wrapper-holders 108 may be made interchangeable to accommodate wrappers of different diameters corresponding to the diameter of the coins operated upon by the machine.

The above-described coin counting and wrapping machine performs its operations in the following manner:—Assume that it is desired to count and package one-cent coins in wrappers containing fifty coins. First the turret 32 is turned so as to present in registration beneath the discharge-mouth 15 of the hopper mechanism the stacker-tube 37 which is adapted to stack one-cent coins. Then the slide-plate 85 is moved outwardly and locked in position to normally project said stop-post 86 in the path of said stop-pawl 94 connected with the gear-wheel 72. The coins are deposited in the hopper 5 which is rotated by its transmission mechanism. The coins in said hopper being agitated by the rotation of the inclined hopper fall into the openings 11 in the bottom thereof, and are thus carried upwardly until said openings pass over the opening 14 of the coin-conveying trough 13, into which the coins fall and are then conveyed thereby through the mouth 15 so as to be precipitated into said stacker-tube in which they pile or stack themselves one upon the other. In the meantime the stop-post 86 having been withdrawn from the path of said stop-pawl 94 by pressing downwardly the swing-plate 83, thus leaving said gear-wheel 72 free to rotate, the kicker disk 58 is rotated by its operating means to remove the successive bottom coins from the stacker-tube and propel the same into contact with one of said marginal-depressions 66 of the counter-disk 65, as the coin passes said counter-disk its engagement with the depression 66 partially rotates the counter-disk 65, the coin moving into the marginal-recess 61 adjacent to the kicker-arm 60 during this movement which while operatively holding said coin in engagement with said counter-disk also permits the same to pass by the counter-disk while giving the latter a registering or counting-impulse. There being ten depressions 66 in said counter-disk it will be apparent that the passage of ten coins in actuating contact therewith will cause said counter-disk to make one revolution. The movement of said counter-disk being transmitted through the spur-gear 71 connected with its spindle to the gear-wheel 72, the latter will make one-fifth of a revolution to one revolution of said counter-disk and spur-gear. Consequently when fifty coins pass by said counter-disk the same will make five revolutions, and said gear-wheel 72 will have accomplished one revolution. As the fiftieth coin passes said counter-disk, the said gear-wheel 72 has carried the stop-pawl 94 around in such a position that it again engages said stop-post 86 which projects within its path, and being brought up against said stop-post the gear-wheel 72 is stopped against further rotation, and consequently owing to the geared connection between them the counter-disk also is stopped. The counter-disk being thus immovable the fifty-first coin cannot actuate the same, nor can the kicker-disk force said fifty-first coin past the counter-disk until the same is again free to move or rotate. Thus it will be apparent that the fifty coins having been accurately counted, are deposited in the wrapper, which may be removed, and a new wrapper inserted in the holder for the next lot of coins. When a new wrapper is ready to receive the next lot of coins, the swinging-plate 83 is pushed downward against the tension of the spring 92, thereby carrying with it the slide-plate 85 and stop-post 86 connected therewith. Such movement withdraws the stop-post 86 from stopping or holding relation with said stop-pawl 94 and the spring 95 of the latter moves the same forward to normal position or stopped relation against said stop-pin 96. Now if the swing-plate 83 is released and its upward movement caused by the spring 92, it cannot carry said stop-post 86 in front of said stop-pawl 94 owing to the latter's above-described change of position, but the end of said stop-post will fetch up against the under side of said stop-pawl 94 and will so remain until the rotation of said gear-wheel 72 carries said stop-pawl away permitting said stop-post to again resume its normal position as projected into the path of rotation of said stop-pawl. It will be apparent that when said stop-pawl is released from its stopped position as just described, the kicker-disk 58 may be again operated to pass fifty more coins into actuating contact with said counter-disk with the consequent repetition of the operations first described. In this manner the coins may be counted out in lots of fifty and delivered to the wrappers until they are exhausted from the hopper and stacker-tube. When it is desired to count and package ten-cent coins, the said turret 32 may be turned to present the stacker-tube 39, which is adapted to accommodate coins of that denomination, beneath the mouth 15 of the hopper-mechanism. The kicker-disk 58 is reversed to so present its kicker-arms 60 as to provide for the reception of the coins in the marginal recesses 62 adapted to said ten-cent coins, as the same are propelled into actuating contact with said counter-disk. Since it is customary to also count out and wrap said ten-cent coins in lots of fifty to the package, it is unnecessary to change the coin counting mechanism, which will operate in the same manner as above described in connection with the discussion of counting the one-cent coins.

When it is desired to count and package five-cent coins, it follows, that the stacker-tube 38 must be properly related to the hopper-mechanism, and that the proper kicker-disk must be connected with its operating spindle. Since, however, five-cent coins are usually wrapped in packages of forty coins amounting in value to two dollars, it is necessary to change the coin-counting mechanism to accommodate it to this condition. To this end the slide-plate 85 is moved inwardly to shift the normal position of said stop-post 86 so that the same will be presented in the path of rotation of said stop-pawl 99 which is connected with the gear-wheel 78. Since the gear-wheel 78 has a ratio of movement with reference to said counter-disk of one revolution to four of said counter-disk, and since ten coins in passing said counter-disk actuates the same to produce one revolution thereof, it follows that the passage of forty coins in actuating relation to said counter-disk will cause a complete revolution of said gear-wheel 78 whereby its stop-pawl is carried into stopped relation to said stop-post 86 upon the passing of the fortieth coin. In this case the gear-wheel 72 acts merely as an idler or intermediate transmission gear between said spur-gear 71 and said gear-wheel 78 and the same does not effect the ratio of rotation existing between the latter, as will be apparent. It will also be understood that the operation and releasing of the stop-means is the same as already described, with the single difference that it is effected by the actuating contact of forty coins instead of fifty. When changing the said stop-means to operate by the passage of forty coins instead of fifty by shifting the slide-plate 85 to carry said stop-pawl into position to engage the stop-pawl 99, the latter will not be in position to assume its normal stopped engagement with said stop-post, hence said hand-wheel or grip 105 must be turned to rotate the gears to carry said stop-pawl 99 into a proper initial relation to said stop-post before the coins are propelled into contact with the coin-counting mechanism. Once this initial position is established the stop means of said counting mechanism will continue to operate upon the passage of forty coins, until again changed to operate upon the passage of fifty coins, when a like adjustment must be effected.

When it is desired to count and package twenty-five cent coins, the stacker-tube 40 must be registered with the hopper mechanism, and the proper kicker-disk connected with its driving spindle. Since however said twenty-five cent coins are usually wrapped in lots of forty coins amounting in value to ten dollars, the automatic stop means of the counting-mechanism is arranged to operate in the manner described in connection with the discussion of the counting of the five-cent coins.

Frequently it is desired to make a mere numerical count of a large quantity of coins without counting out the same into lots of forty and fifty. When such is the case the slide-plate 85 is moved into such position as to present said stop-post 86 midway between the gears 72 and 78 and consequently out of the path of both of the respective stop-pawls connected therewith. When in such position said stop-post will not prevent the continuous rotation of the gears 72 and 78, and consequently will not stop the continuous operation of the counter-disk so long as coins are propelled into actuating contact therewith. The counter-disk then tallies continuously the passage of each coin thereby which tally is registered by the operation of the total-adder mechanism geared in connection with said counter-disk as above described. Thus it follows that a continuous uninterrupted counting of the coins in large quantities may be effected.

I am aware that some changes may be made in the general arrangements and combinations of the various devices and parts, as well as in the details of the construction thereof, without departing from the scope of the present invention as set forth in the foregoing specification, and as defined in the clauses of the claim which are appended to the same. Hence, I do not limit my invention to the exact arrangements and combinations of the devices and parts as described in the said specification, nor do I confine myself to the exact details of the construction of the said devices and parts as illustrated in the accompanying drawings.

I claim:—

1. In a coin-counting and wrapping machine, a frame-work, a table supported thereby, a rotatable turret detachably connected with said table, said turret having a plurality of vertical openings, a plurality of stacker-tubes mounted in said vertical openings, each stacker-tube being adapted to accommodate coins of a different denomination from those accommodated by its fellow stacker-tubes, the bottom of said turret having cut-away portions adapted to provide a space between the surface of said table and the bottoms of said stacker-tubes, each space being slightly greater in height than the thickness of the coins contained in the stacker tube beneath which said space is located, means for feeding coins, said stacker-tubes being selectively registrable with said coin feeding means by turning said turret, means for holding said turret in its adjusted position against rotation, a coin-counting mechanism, and means for propelling the bottom coin from the operating stacker-tube and from beneath said turret into actuating contact with said coin-counting mechanism.

2. In a coin-counting and wrapping machine, a frame-work, a table supported thereby, an inclined bed-plate having an upwardly extending marginal flange supported on the upper end of said frame-work above said table, an inclined coin-conveying trough connected with the bottom of said bed-plate, said bed-plate having an opening communicating with said coin conveying trough, a discharge means at the lower end of said coin-conveying trough, a hopper rotatably arranged upon said bed-plate, means for rotating said hopper, said hopper having a plurality of openings in its bottom in which the coins lodge and through which the coins pass into said coin-conveying trough when said openings pass over the opening in said bed-plate communicating with said coin-conveying trough as said hopper rotates, a rotatable turret detachably connected with said table, a plurality of stacker-tubes supported by said turret, each stacker-tube being adapted to accommodate coins of a different denomination from those accommodated by its fellow stacker-tubes, said stacker tubes being selectively registered beneath said discharge means of said coin-conveying trough by turning said turret, a coin-counting mechanism, and means for propelling the bottom coin from the operating stacker-tube into actuating contact with said coin-counting mechanism.

3. In a coin-counting and wrapping machine, a frame-work, a table supported thereby, an inclined bed-plate having an upwardly extending marginal flange supported on the upper end of said frame-work above said table, an inclined coin-conveying trough connected with the bottom of said bed-plate, said bed-plate having an opening communicating with said coin-conveying trough, a discharge means at the lower end of said coin-conveying trough, a centrally disposed vertical bearing portion connected with said bed-plate, a spindle journaled in said bearing-portion, a head of polygonal configuration connected with said spindle and exposed above the surface of said bed-plate, a hopper having a centrally disposed opening of polygonal configuration adapted to receive said head of said spindle to rotatably mount said hopper on said bed-plate, bearing-members depending from said bed-plate, a shaft journaled in said bearing members, a bevel-gear on said shaft, a bevel gear on the lower end of said spindle meshing with said shaft, a driving-pulley loosely mounted upon one end of said shaft, a clutch-means for operatively connecting said driving-pulley with said shaft, and said hopper having a plurality of openings in its bottom in which the coins lodge and through which the coins pass into said coin-conveying trough when said openings pass over the opening in said bed-plate communicating with said coin-conveying trough as said hopper rotates.

4. In a coin-counting and wrapping machine, a frame-work, a table supported thereby, an inclined bed-plate having an upwardly extending marginal flange supported on the upper end of said frame-work above said table, an inclined coin-conveying trough connected with the bottom of said bed-plate, said bed-plate having an opening communicating with said coin-conveying trough, a discharge-means at the lower end of said coin-conveying trough, a centrally disposed vertical bearing portion connected with said bed-plate, a spindle journaled in said bearing portion, a head of polygonal configuration connected with said spindle and exposed above the surface of said bed-plate, a hopper having a centrally disposed opening of polygonal configuration adapted to receive said head of said spindle to rotatably mount said hopper on said bed-plate, bearing-members depending from said bed-plate, a shaft journaled in said bearing-members, a bevel-gear on said shaft, a bevel-gear on the lower end of said spindle meshing with said shaft, a driving-pulley loosely mounted upon one end of said shaft, a clutch-means for operatively connecting said driving-pulley with said shaft, said hopper having a plurality of openings in its bottom in which the coins lodge and through which the coins pass into said coin-conveying trough when said openings pass over the opening in said bed-plate communicating with said coin-conveying trough as said hopper rotates, a rotatable turret detachably mounted with said table, a plurality of stacker-tubes supported by said turret, each stacker-tube being adapted to accommodate coins of a different denomination from those accommodated by its fellow stacker-tubes, said stacker tubes being selectively registered beneath said discharge means of said coin-conveying trough by turning said turret, a coin-counting mechanism, and means for propelling the bottom coin from the operating stacker-tube into actuating contact with said coin-counting mechanism.

5. In a machine of the kind described, a coin-counting mechanism, means for propelling coins into actuating contact with said coin-counting mechanism, means for supplying coins to said propelling means, said coin-counting mechanism comprising, a rotatable counter-disk provided with a plurality of marginal depressions adapted to receive contact from the perimeter of a passing coin whereby said counter-disk is rotated, a spindle upon which said counter-disk is mounted, a spur-gear fixed upon said spindle, a gear-wheel rotatably mounted to mesh with said spur-gear, said gear-wheel being adapted to make a complete revolution when said counter-disk has been actuated by a predetermined number of coins, a stop-pawl carried by said gear-wheel, a stop-post, a movable means for supporting said stop-post to project the same into the path of rotation of said stop-pawl, said stop-post being adapted to engage said stop-pawl in holding relation when said gear-wheel has made one revolution, and a spring for causing said stop-pawl to make a partial forward rotation independently of said gear-wheel when said stop-post is withdrawn from its holding relation thereto, and thereby positioning said stop-pawl to prevent the return of said stop-post into its restraining position until said gear-wheel has made another revolution.

6. In a machine of the kind described, a coin-counting mechanism, means for propelling coins into actuating contact with said coin-counting mechanism, means for supplying coins to said propelling means, said coin-counting mechanism comprising, a rotatable counter-disk provided with a plurality of marginal depressions adapted to receive contact from the perimeter of a passing coin whereby said counter-disk is rotated, a spindle upon which said counter-disk is mounted, a spur-gear fixed upon said spindle, a gear-wheel rotatably mounted to mesh with said spur-gear, said gear-wheel being adapted to make a complete revolution when said counter-disk has been actuated by a predetermined number of coins, a stop-pawl carried by said gear-wheel, a stop-post, a movable means for supporting said stop-post to project the same into the path of rotation of said stop-pawl, said stop-post being adapted to engage said stop-pawl in holding relation when said gear-wheel has made one revolution, a spring for causing said stop-pawl to make a partial forward rotation independently of said gear-wheel when said stop-post is withdrawn from its holding relation thereto and thereby positioning said stop-pawl to prevent the return of said stop-post into its restraining position until said gear-wheel has made another revolution, and a total adder mechanism geared in operative relation to said gear-wheel for tallying the actuating contact of each coin with said counter-disk.

7. In a machine of the kind described, a coin-counting mechanism, means for propelling coins into actuating contact with said coin-counting mechanism, means for supplying coins to said propelling means, said coin-counting mechanism comprising, a rotatable counter-disk provided with a plurality of marginal depressions adapted to receive contact from the perimeter of a passing coin whereby said counter-disk is rotated, a spindle upon which said counter-disk is mounted, a spur-gear fixed upon said spindle, a gear-wheel rotatably mounted to mesh with said spur-gear, said gear-wheel being adapted to make a complete revolution when said counter-disk has been actuated by a predetermined number of coins, a second smaller gear-wheel rotatably mounted to mesh with said first-mentioned gear-wheel, said second gear-wheel being adapted to make a complete revolution when said counter-disk has been actuated by a predetermined lesser number of coins, a stop-pawl carried by each gear-wheel, a swing-plate pivoted to swing vertically beneath said gear-wheels, a slide plate carried by said swing-plate, a stop-post supported by said slide-plate, said slide-plate being movable to selectively project said stop-post into the path of rotation of either of said stop-pawls or into the path of neither of the same, said stop-post when properly positioned being adapted to engage a stop-pawl in holding relation when the gear-wheel with which it is connected has made one revolution, and a spring connected with each stop-pawl for causing the same to make a partial forward rotation independently of the gear-wheel with which it is connected when said stop-post is withdrawn from its holding relation thereto and thereby positioning said stop-pawl to prevent the return of said stop-post into its restraining position until said gear-wheel has made another revolution.

8. In a machine of the kind described, a coin-counting mechanism, means for propelling coins into actuating contact with said coin-counting mechanism, means for supplying coins to said propelling means, said coin-counting mechanism comprising, a rotatable counter-disk provided with a plurality of marginal depressions adapted to receive contact from the perimeter of a passing coin whereby said counter-disk is rotated, a spindle upon which said counter-disk is mounted, a spur-gear fixed upon said spindle, a gear-wheel rotatably mounted to mesh with said spur-gear, said gear-wheel being adapted to make a complete revolution when said counter-disk has been actuated by a predetermined number of coins, a second smaller gear-wheel rotatably mounted to mesh with said first-mentioned gear-wheel, said second gear-wheel being adapted to make a complete revolution when said counter-disk has been actuated by a predetermined lesser number of coins, a stop-pawl carried by each gear-wheel, a swing-plate pivoted to swing vertically beneath said gear-wheels, a slide-plate carried by said swing-plate, a stop-post supported by said slide-plate, said slide-plate being movable to selectively project said stop-post into the path of rotation of either of said stop-pawls or into the path of neither of the same, said stop-post when properly positioned being adapted to engage a stop-pawl in holding relation when the gear-wheel with which it is connected has made one revolution, a spring connected with each stop-pawl for causing the same to make a partial forward rotation independently of the gear-wheel with which it is connected when said stop-post is withdrawn from its holding relation thereto and thereby positioning said stop-pawl to prevent the return of said stop-post into its restraining position until said gear-wheel has made another revolution, and a total adder mechanism geared in operative relation to said first-mentioned gear-wheel for tallying the actuating contact of each coin with said counter-disk.

9. In a machine of the kind described, a table, a coin-counting mechanism mounted in connection with said table, means mounted on said table for propelling coins into actuating contact with said coin-counting mechanism, means for supplying coins to said propelling means, said coin-counting mechanism comprising, a rotatable counter-disk positioned upon the upper surface of said table provided with a plurality of marginal depressions adapted to receive contact from the perimeter of a passing coin whereby said counter-disk is rotated, a spindle journaled in said table upon which said counter-disk is fixed, a spur-gear fixed upon said spindle beneath said table, journal studs connected with the under side of said table, a gear-wheel rotatably mounted on one of said journal studs and in mesh with said spur-gear, said gear-wheel being adapted to make a conplete revolution when said counter-disk has been actuated by a predetermined number of coins, a second smaller gear-wheel rotatably mounted on the other of said journal-studs and in mesh with said first-mentioned gear-wheel, said second gear-wheel being adapted to make a complete revolution when said counter-disk has been actuated by a predetermined lesser number of coins, a stop-pawl journaled on the hub of each of said gear-wheels, a stop-pin connected with each gear-wheel for determining the normal position of each stop-pawl, and a second stop-pin on each gear-wheel for limiting the stop engaged position of each stop-pawl, a swing-plate pivoted to swing vertically beneath said gear-wheel, a spring for maintaining said swing-plate in normal position, a slide-plate carried by said swing-plate, a stop-post supported by said slide-plate, said slide-plate being movable to selectively project said stop-post into the path of rotation of either of said stop-pawls or into the path of neither of the same, said stop-post when properly positioned being adapted to engage a stop-pawl in holding relation when the gear-wheel with which it is connected has made one revolution, and a spring connected with each stop-pawl for causing the same to make a partial forward rotation independently of the gear-wheel with which it is connected when said stop-pawl is withdrawn from its holding relation thereto and thereby positioning said stop-pawl to prevent the return of said stop-post into its restraining position until said gear-wheel has made another revolution.

10. In a machine of the kind described, a table, a coin-counting mechanism mounted in connection with said table, means mounted on said table for propelling coins into actuating contact with said coin-counting mechanism, means for supplying coins to said propelling means, said coin-counting mechanism comprising, a rotatable counter-disk positioned upon the upper surface of said table provided with a plurality of marginal depressions adapted to receive contact from the perimeter of a passing coin whereby said counter-disk is rotated, a spindle journaled in said table upon which said counter-disk is fixed, a spur-gear fixed upon said spindle beneath said table, journal studs connected with the under side of said table, a gear-wheel rotatably mounted on one of said journal studs and in mesh with said spur-gear, said gear-wheel being adapted to make a complete revolution when said counter-disk has been actuated by a predetermined number of coins, a second smaller gear-wheel rotatably mounted on the other of said journal studs and in mesh with said first-mentioned gear-wheel, said second gear-wheel being adapted to make a complete revolution when said counter-disk has been actuated by a predetermined lesser number of coins, a stop-pawl journaled on the hub of each of said gear-wheels, a stop pin connected with each gear-wheel for determining the normal position of each stop-pawl, and a second stop-pin on each gear-wheel, for limiting the stop engaged position of each stop-pawl, a swing-plate pivoted to swing vertically beneath said gear-wheels, a spring for maintaining said swing-plate in normal position, a slide-plate carried by said swing-plate, a stop-post supported by said slide-plate, said slide-plate being movable to selectively project said stop-post into the path of rotating of either of said stop-pawls or into the path of neither of the same, said stop-post when properly positioned being adapted to engage a stop-pawl in holding relation when the gear-wheel with which it is connected has made one revolution, a spring connected with each stop-pawl for causing the same to make a partial forward rotation independently of the gear-wheel with which it is connected when said stop-pawl is withdrawn from its holding relation thereto and thereby positioning said stop-pawl to prevent the return of said stop-post into its restraining position until said gear-wheel has made another revolution, and a total-adder mechanism geared in operative relation to said first-mentioned gear-wheel for tallying the actuating contact of each coin with said counter-disk.

11. In a machine of the kind described, a coin-counting mechanism comprising a counter-disk having ten marginal depressions adapted to receive actuating contact from the perimeters of coins propelled past the same so that said counter-disk makes one revolution after the actuating contact of ten coins, a spindle upon which said counter-disk is fixed, a spur-gear on said spindle, a gear-wheel rotatably mounted to mesh with said spur-gear, said gear-wheel having a one to five ratio to said spur-gear whereby five revolutions of the latter causes one revolution of the former, a stop-engaging means carried by said gear-wheel, a second smaller gear-wheel rotatably mounted to mesh with said first-mentioned gear-wheel, said second gear-wheel having a one to four ratio to said spur-gear whereby four revolutions of the latter causes one revolution of the former, a stop-engaging means carried by said second gear-wheel, a stop-post, means for selectively positioning said stop-post in the path of said stop-engaging means of either gear-wheel, and means for withdrawing said stop-post from its stopping position.

12. In a machine of the kind described, a coin-counting mechanism comprising a counter-disk having ten marginal depressions adapted to receive actuating contact from the perimeters of coins propelled past the same so that said counter-disk makes one revolution after the actuating contact of ten coins, a spindle upon which said counter-disk is fixed, a spur-gear on said spindle, a gear-wheel rotatably mounted to mesh with said spur-gear, said gear-wheel having a one to five ratio to said spur-gear whereby five revolutions of the latter causes one revolution of the former, a stop-engaging means carried by said gear-wheel, a second smaller gear-wheel rotatably mounted to mesh with said first-mentioned gear-wheel, said second gear-wheel having a one to four ratio to said spur-gear whereby four revolutions of the latter causes one revolution of the former, a stop-engaging means carried by said second gear-wheel, a stop-post, means for selectively positioning said stop-post in the path of said stop-engaging means of either gear-wheel, means for withdrawing said stop-post from its stopping position, and a total-adder mechanism geared in operative relation to said first-mentioned gear-wheel for tallying the actuating contact of each coin with said counter-disk.

13. In a machine of the kind described, a coin-counting mechanism comprising a counter-disk provided with a plurality of marginal depressions adapted to receive actuating contact from the perimeters of coins propelled in passing engagement therewith, a spindle upon which said counter-disk is mounted, a spur-gear fixed upon said spindle, a gear-wheel rotatably mounted to mesh with said spur-gear, said gear-wheel being adapted to make a complete revolution when said counter disk has been actuated by a predetermined number of coins, a stop-engaging means carried by said gear-wheel, a second smaller gear-wheel rotatably mounted to mesh with said first-mentioned gear-wheel, said second gear-wheel being adapted to make a complete revolution when said counter disk has been actuated by a predetermined lesser number of coins, a stop-engaging means carried by said second gear-wheel, a stop-post, means for selectively positioning said stop-post in the path of said stop-engaging means of either gear-wheel, and means for withdrawing said stop-post from its stopping position.

14. In a machine of the kind described, a coin-counting mechanism comprising a counter-disk provided with a plurality of marginal depressions adapted to receive actuating contact from the perimeters of coins propelled in passing engagement therewith, a spindle upon which said counter-disk is mounted, a spur-gear fixed upon said spindle, a gear-wheel rotatably mounted to mesh with said spur-gear, said gear-wheel being adapted to make a complete revolution when said counter disk has been actuated by a predetermined number of coins, a stop-engaging means carried by said gear-wheel, a second smaller gear-wheel rotatably mounted to mesh with said first-mentioned gear-wheel, said second gear-wheel being adapted to make a complete revolution when said counter-disk has been actuated by a predetermined lesser number of coins, a stop-engaging means carried by said second gear-wheel, a stop-post, means for selectively positioning said stop-post in the path of said stop-engaging means of either gear-wheel, means for withdrawing said stop-post from its stopping position, and a total-adder mechanism geared in operative relation to said first mentioned gear-wheel for tallying the actuating contact of each coin with said counter-disk.

15. In a machine of the kind described, a coin-counting mechanism, means for propelling coins into actuating contact with said coin-counting mechanism, means for supplying coins to said propelling means, said propelling means comprising, a driving-spindle, means for rotating said driving spindle, a bevel-gear fixed on said driving spindle, a vertical spindle, a bevel-gear fixed upon said vertical spindle and normally meshing with said first-mentioned bevel-gear, said vertical spindle having a longitudinal movement in its bearings, a spring adapted to normally maintain said vertical spindle against said longitudinal movement, a kicker-disk, means for detachably securing said kicker-disk to said vertical spindle, and said kicker-disk having a plurality of radiating kicker-arms having adjacent to their sides marginal recesses corresponding to the perimeter of the coins to be propelled.

16. In a machine of the kind described, an interchangeable kicker-disk comprising a body-portion provided with means for securing the same to an operating spindle, a plurality of radiating kicker-arms extending from said body-portion, said body-portion being provided adjacent to one side of each kicker-arm with marginal recesses corresponding to the perimeters of one size of coins, and said body-portion being further provided adjacent to the other side of each kicker-arm with marginal recesses corresponding to the perimeters of another size of coin.

In testimony, that I claim the invention set forth above I have hereunto set my hand this thirty-first day of January, 1913.

ALFRED C. O. BOCK.

Witnesses:
  GEORGE D. RICHARDS,
  MAYBELLE MCADOO.